US007089192B2

(12) United States Patent
Bracchitta et al.

(10) Patent No.: US 7,089,192 B2
(45) Date of Patent: Aug. 8, 2006

(54) INTELLECTUAL PROPERTY MANAGEMENT METHOD AND APPARATUS

(75) Inventors: John Anthony Bracchitta, South Burlington, VT (US); Patricia McGuinness Marmillion, Colchester, VT (US); Bernadette Ann Pierson, South Hero, VT (US); Henry Charles Rickers, Poughkeepsie, NY (US); Howard J. Walter, Jr., Shelburne, VT (US)

(73) Assignee: International Business Machines Corporation, Armonk, NY (US)

( * ) Notice: Subject to any disclaimer, the term of this patent is extended or adjusted under 35 U.S.C. 154(b) by 1019 days.

(21) Appl. No.: 09/748,579

(22) Filed: Dec. 22, 2000

(65) Prior Publication Data

US 2002/0082890 A1  Jun. 27, 2002

(51) Int. Cl.
G06F 17/60 (2006.01)
(52) U.S. Cl. .................. 705/8; 705/1; 705/7; 707/3
(58) Field of Classification Search ............. 705/9, 705/1, 7–8; 707/3
See application file for complete search history.

(56) References Cited

U.S. PATENT DOCUMENTS

| 5,530,520 | A |  | 6/1996 | Clearwater .................. 355/201 |
| 5,706,502 | A |  | 1/1998 | Foley et al. ................. 395/610 |
| 5,991,876 | A |  | 11/1999 | Johnson et al. ............. 713/200 |
| 5,999,907 | A |  | 12/1999 | Donner .......................... 705/1 |
| 6,018,714 | A |  | 1/2000 | Risen, Jr. et al. ............... 705/4 |
| 6,044,354 | A | * | 3/2000 | Asplen, Jr. ..................... 705/7 |
| 6,308,164 | B1 | * | 10/2001 | Nummelin et al. ............ 705/9 |
| 6,542,871 | B1 | * | 4/2003 | Harshaw ........................ 705/7 |
| 6,665,656 | B1 | * | 12/2003 | Carter ............................ 707/3 |

FOREIGN PATENT DOCUMENTS

WO   WO 9826343 A2 * 6/1998

OTHER PUBLICATIONS

Hsu, Managing the university technology licensing process: findings from case studies, 1997, Journal of the Association of Technology Managers, v.IX [online access Dec. 6, 2004] Retrieved from Internet URL: http://www.autm.net/pubs/journal/97/1-97.html.*

(Continued)

*Primary Examiner*—Romain Jeanty
(74) *Attorney, Agent, or Firm*—Richard M. Kotulak, Esq.; Kevin P. Radigan, Esq.; Heslin Rothenberg Farley & Mesiti, P.C.

(57) ABSTRACT

An intellectual property management facility for proactively creating, developing and managing an intellectual property portfolio includes: determining available resource capacity for an intellectual property activity in a tracking system; assigning technical attributes to the activity in the tracking system; apportioning resource capacity for the activity by technical attribute based on the value assigned to each of the technical attributes and based on available resource capacity; obtaining actual resource usage by technical attribute from the tracking system; and managing resource allocation for the intellectual property activity by determining the difference between the actual resource usage and the resource allocation by technical attribute.

45 Claims, 5 Drawing Sheets

OTHER PUBLICATIONS

Watson, Invention triage: allocating resources for maximum benefit, 1995, Journal of the Association of Technology Managers, v.VII [online access Dec. 6, 2004] Retrieved from Internet URL: http://www.autm.net/pubs/journal/95/IT95.html.*

Murtha, Companies urged to see teh ptential in their rights portfolio, Jul./Aug. 1998, Managing Intellectual Property, i.81, p. 8 [EBSCOhost/Business Source Corporate].*

Business News New Jersey, Emmitt Murtha on how to protect and profit from the intellectual property your company has, Mar. 14, 2000, v.13, i.11,p. 25 [EBSCOhost/Business Source Corporate].*

Ukkola, Making your assets work, May 1999, Managing Intellectual Property, i.89, p. 30 [ProQuest].*

Bosworth, Research and development, intangible assets and the performance of large Australian companies, Jan. 1998, University of Melbourne, paper No. 2/98, issn. 1328-4991 [online access Dec. 6, 2004] [GOOGLE Scholar] Retrieved from Internet URI: http://www . . . .*

Powell, Tracking patents with IPAM, Apr./Jun. 1999, Competitive Intelligence Magazine, v.2, n.2, p. 33-34.*

Steven; "Patent pools and antitrust dilemma"; Aug. 1999; Yale Journal on Registration. New HAVEN: vol. 16, Iss 2; p. 359, 41 pages.*

* cited by examiner fig. 1 fig. 2

DISCLOSURE STATUS REPORT
MONTH, YEAR

| TECHNOLOGY MAJOR CATEGORY | LOCATION | % RATED SEARCH LAST 12 MONTHS | % RATED SEARCH LAST 3 MONTHS | NUMBER CURRENTLY WAITING FOR EVALUATION | NUMBER EVALUATED YEAR TO DATE | NUMBER RATED SEARCH YEAR TO DATE | YEAR TO DATE/TOTAL YEAR GUIDELINE |
|---|---|---|---|---|---|---|---|
| SEMICONDUCTOR PROCESSING | A | 50% | 50% | 1 | 2 | 1 | |
| | B | 56% | 58% | 40 | 170 | 92 | |
| | C | 77% | 100% | 1 | 10 | 7 | |
| | D | 70% | 71% | 95 | 251 | 179 | |
| | TOTAL | 64% | 68% | 137 | 433 | 279 | 226/271 |
| SEMICONDUCTOR MANUFACTURING | A | | | 1 | 0 | 0 | |
| | B | 27% | 14% | 22 | 40 | 10 | |
| | C | 67% | 100% | 0 | 3 | 2 | |
| | D | 60% | 42% | 9 | 42 | 25 | |
| | TOTAL | 45% | 26% | 32 | 85 | 37 | 24/29 |
| SEMICONDUCTOR TESTING | A | 50% | | 0 | 1 | 1 | |
| | B | 56% | 73% | 21 | 61 | 32 | |
| | C | 0% | | 0 | 0 | 0 | |
| | D | 52% | 50% | 3 | 28 | 15 | |
| | TOTAL | 54% | 69% | 24 | 90 | 48 | 47/57 |
| CIRCUITS | A | 97% | 86% | 2 | 29 | 28 | |
| | B | 73% | 77% | 9 | 79 | 59 | |
| | C | 75% | | 1 | 6 | 4 | |
| | D | 80% | 44% | 10 | 37 | 31 | |
| | TOTAL | 79% | 71% | 22 | 151 | 122 | 129/155 |
| MEMORIES | A | 100% | | 0 | 2 | 2 | |
| | B | 90% | 100% | 2 | 5 | 4 | |
| | C | 0 | | 1 | 1 | 0 | |
| | D | 79% | 85% | 17 | 48 | 41 | |
| | TOTAL | 80% | 86% | 20 | 56 | 47 | 31/37 |

*fig. 3A*

DISCLOSURE STATUS REPORT
(CONTINUED)
MONTH, YEAR

| TECHNOLOGY MAJOR CATEGORY | LOCATION | % RATED SEARCH LAST 12 MONTHS | % RATED SEARCH LAST 3 MONTHS | NUMBER CURRENTLY WAITING FOR EVALUATION | NUMBER EVALUATED YEAR TO DATE | NUMBER RATED SEARCH YEAR TO DATE | YEAR TO DATE/TOTAL YEAR GUIDELINE |
|---|---|---|---|---|---|---|---|
| INTERCONNECT TECHNOLOGY | A | 100% |  | 2 | 5 | 5 |  |
|  | B | 71% | 100% | 1 | 4 | 3 |  |
|  | C | 61% | 57% | 16 | 125 | 74 |  |
|  | D | 47% | 52% | 22 | 97 | 46 |  |
|  | TOTAL | 56% | 55% | 41 | 231 | 128 | 106/128 |
| COMPUTER ARCHITECTURE | A | 84% | 67% | 3 | 23 | 19 |  |
|  | B | 44% | 50% | 2 | 9 | 4 |  |
|  | C | 50% |  | 0 | 2 | 1 |  |
|  | D | 100% |  | 0 | 2 | 2 |  |
|  | TOTAL | 75% | 60% | 5 | 36 | 26 | 33/40 |
| APPLICATIONS | A | 79% | 50% | 2 | 24 | 19 |  |
|  | B | 44% | 47% | 14 | 65 | 28 |  |
|  | C | 94% | 100% | 1 | 12 | 11 |  |
|  | D | 56% | 56% | 16 | 28 | 16 |  |
|  | TOTAL | 58% | 52% | 33 | 129 | 74 | 72/87 |
| NETWORKING | A | 93% | 93% | 12 | 76 | 70 |  |
|  | B | 33% | 43% | 4 | 12 | 4 |  |
|  | C | 100% | 100% | 1 | 2 | 2 |  |
|  | D | 17% |  | 5 | 11 | 1 |  |
|  | TOTAL | 79% | 84% | 22 | 101 | 77 | 74/88 |
| ALL TECHNOLOGY TAGS | A | 90% | 86% | 23 | 162 | 145 |  |
|  | B | 55% | 55% | 115 | 445 | 236 |  |
|  | C | 65% | 64% | 21 | 161 | 101 |  |
|  | D | 64% | 66% | 177 | 544 | 356 |  |
|  | TOTAL | 64% | 65% | 336 | 1312 | 838 | 743/891 |

*fig. 3B* fig. 4

INTELLECTUAL PROPERTY MANAGEMENT METHOD AND APPARATUS

TECHNICAL FIELD

The present invention relates to intellectual property, and more particularly, to a method, apparatus and computer program product for proactively creating, developing and managing an intellectual property portfolio.

BACKGROUND OF THE INVENTION

The term "intellectual property" refers to patents, trademarks, service marks, copyrights and proprietary technology such as trade secrets or know-how. Intellectual property is a special classification of intangible property, and is unique because the owner of intellectual property is protected by law from unauthorized exploitation of it by others. Computer software is considered intellectual property because it can be subject to patent, trade secret or copyright protection.

Intellectual property is a central resource for creating and maintaining commercial power. Creating, developing and managing of strategic intellectual property to ensure future licensing revenue has become an important goal in almost all industries.

Current intellectual property portfolios are most often developed tactically as the result of solving day-to-day technical problems associated with manufacturing, development, etc. The problem with this approach, however, is that portfolios are inherently the result of a reactive managing of resources; for example, in view of the day-today technical problems solved by inventors within the company.

SUMMARY OF THE INVENTION

In order to build a premier intellectual property portfolio, techniques for targeting strategic (e.g., products, standards, etc.) patent or other intellectual property development opportunities are believed desirable, as well as techniques for measuring invention development progress. This invention addresses these goals by providing proactive intellectual property development and measurement methods, apparatus and computer program products.

Briefly summarized, presented herein in one aspect is a method of managing resource allocations within an intellectual property portfolio. The method includes: determining available resource capacity for an intellectual property activity in a tracking system; assigning technical attributes to the activity in the tracking system; apportioning resource capacity for the activity by technical attribute based on a value assigned to each of the technical attributes and based on available resource capacity; obtaining actual resource usage by technical attribute from the tracking system; and managing resource allocation for the intellectual property activity by determining the difference between the actual resource usage and the resource allocation by technical attribute.

In another aspect, a method of managing invention disclosures is presented. This method includes: determining a desired number of invention disclosures based on available resources; apportioning the desired number of invention disclosures by a plurality of technical attributes based on a value assigned to each of the technical attributes; tracking an actual number of invention disclosures by technical attribute and comparing the actual number of invention disclosures with the desired number of invention disclosures; and responsive to the comparing, proactively managing at least one of invention disclosure creation and invention disclosure evaluation for patent searching or patent application filing.

In a further aspect, a data structure is presented for facilitating managing of resource allocations within an intellectual property portfolio. The data structure has a first field and a second field. The first field includes actual resource usage for an intellectual property activity by technical attributes over a first time period, while the second field includes actual resource usage for the intellectual property activity by technical attributes over a second time period, with the second time period being longer than the first time period. Comparison of information within the first field and the second field facilitates managing resource allocations for the intellectual property activity within the intellectual property portfolio.

Apparatus and computer program products corresponding to the above-summarized methods are also described and claimed herein.

To restate, areas of technology of disclosures have been analyzed historically, but not with an intent of managing future output of any subsystem such as proposed herein. In accordance with the present invention, specific technical areas are monitored in concert with an overall resource capacity on both a short term and long term basis. The invention is particularly beneficial across a distributed organization. Advantageously, the concepts disclosed herein provide an ability to actually manage the number of intellectual property items owned, pending or retained in a portfolio in a particular area of technology. This can be significant in any industry or to any organization which deals in many areas of technology. Another advantage of the present invention is an ability to extend the managing cycle to the life of an IP item, for example, from disclosure evaluation to issuing of patents, to even their maintenance. Thus, presented herein is an intellectual property management process which provides an ability: to optimize an intellectual property portfolio for a value based on current activity within the portfolio; to control cost effectively by screening less desirable technologies more closely; to control cost effectively by having detailed information available about the status of the portfolio and invention activity; and to invigorate invention where needed based on monitored input data.

Additional features and advantages are realized through the techniques of the present invention. Other embodiments and aspects of the invention are described in detail herein and are considered a part of the claimed invention.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

Figure 1:
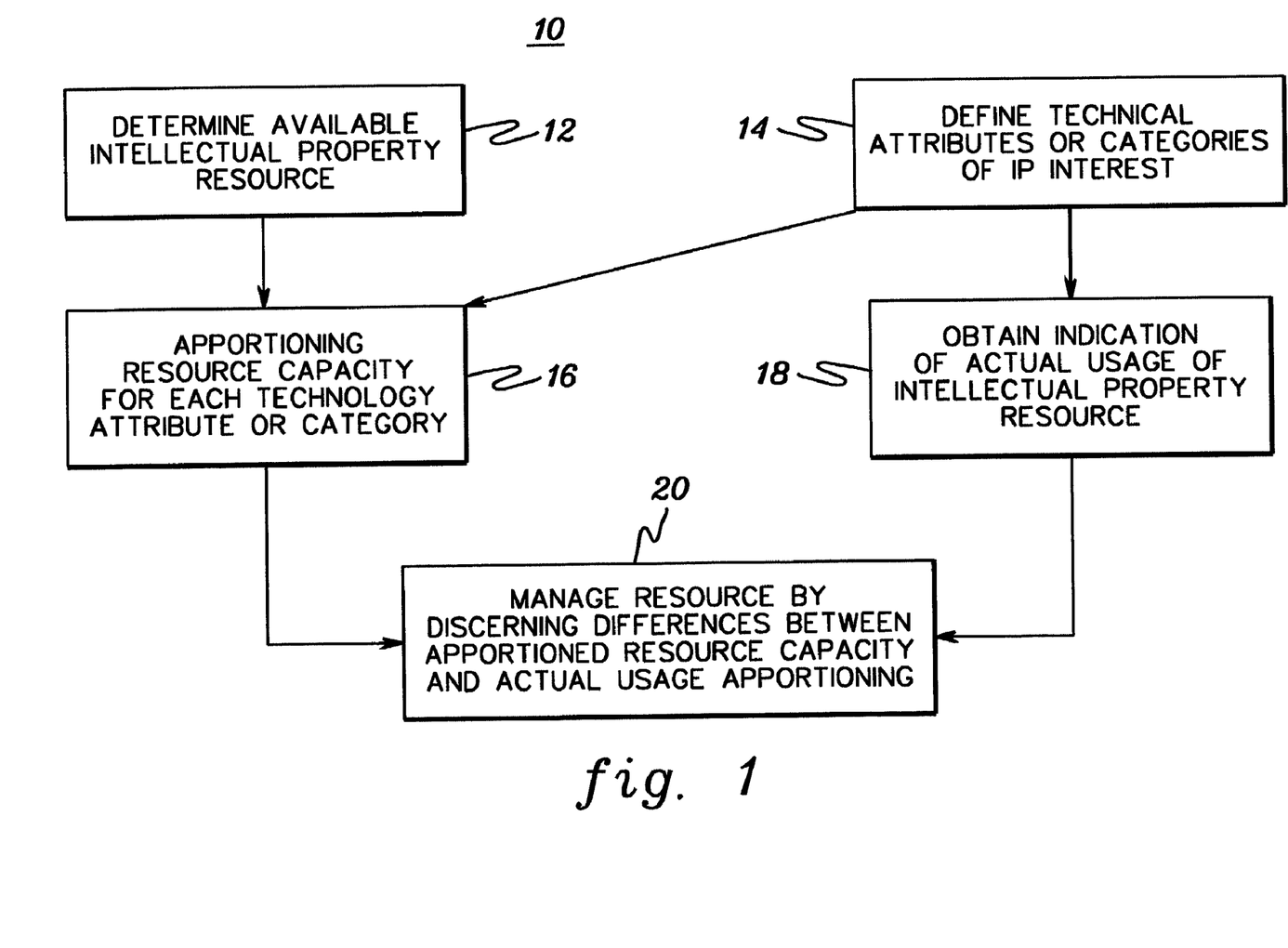
FIG. 1 is a process diagram of one embodiment of an intellectual property management facility in accordance with the principles of the present invention.

FIG. 1 is an overview of one embodiment of an intellectual property (IP) management facility, generally denoted 10, pursuant to the present invention. The facility includes determining an available intellectual property resource 12. "Determining an available resource" can be defined as assessing the money, time units or other constraining measure(s) to be managed. In parallel with this, technical attributes are defined and/or categories of IP interest are established 14. "Defining technical attributes" (herein also referred to as "tags") means breaking down any given technology into at least two groups which need to be managed separately. If desired, a business can be broken down into very specific tags as described further below. These tags can then be grouped into major "areas" to be periodically reported on. Ideally, the tags will cover all areas of interest of a given business.

The available intellectual property resources and the defined technical attributes are inputs used to apportion resource capacity for each technology attribute or category 16. "Apportioning the resource capacity" is the budgeting process of determining how various items are to be divided within an "ideal" management process. For example, each major area is allocated a percentage of the total resource available. These are the "total guidelines" for a given period of time. Note that as an alternative to defining technical attributes 14, preexisting attributes such as Patent Office class and subclassifications could be employed for a given intellectual property portfolio.

Figure 2:
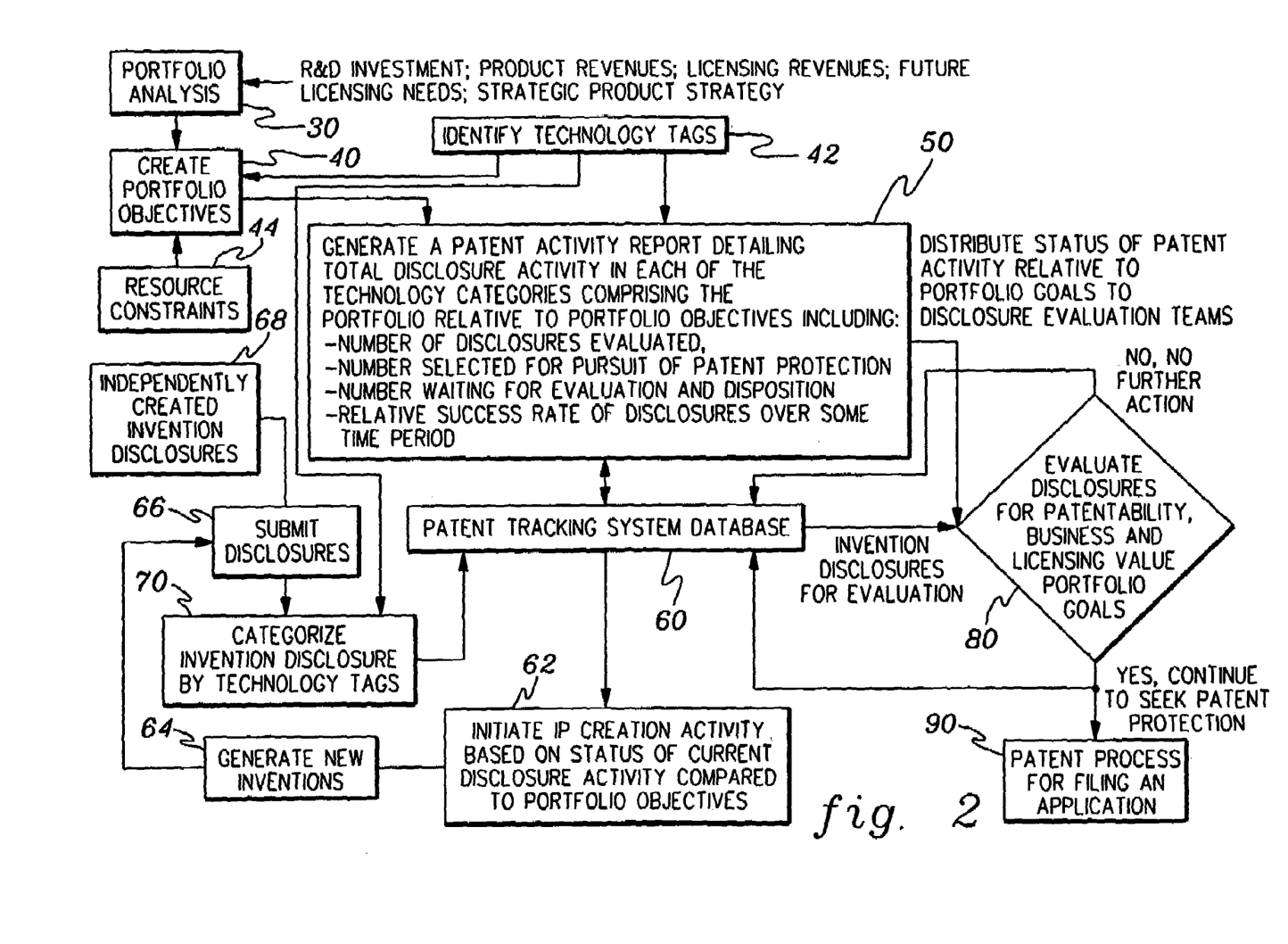
FIG. 2 is a more detailed process diagram of an alternate embodiment of an intellectual property management facility in accordance with the principles of the present invention, wherein invention disclosures are proactively managed and evaluated.

The "actual usage" of an intellectual property resource for a given technical attribute is monitored 18. This information can be stored in and extracted from, for example, a patent tracking database (as described further below). The monitored information may comprise numbers of documents which have been processed for whatever screening/review is being managed. In the example of FIG. 2, disclosures are tracked from submission to first evaluation. The process could be extended to managing any intellectual property activity, for example, managing issuance of patents or maintenance of patents in one or multiple cycles of the basic technique.

The apportioned resource capacity for each technology attribute or category 16 and the actual indication of usage of intellectual property resources by technical attribute or category 18 are employed to actively manage available resources by discerning differences between the apportioned resource capacity and the actual usage apportioning 20. In one embodiment, this proactive managing process can be facilitated by printing a monthly report and reviewing the report with individuals within a business responsible for actual usage decisions, and encouraging or discouraging these individuals to provide more or less output. As a practical matter, various approaches can be employed to effect proactive management using the facility provided herein. For example, one approach might be to establish a team of technical people to specifically create a number of new disclosures/inventions for one or more of the apportioned areas of technology. That is, the technical community can be stimulated using various techniques to increase or decrease their output of ideas in a given technology area.

FIG. 2 depicts one embodiment of a technique for managing invention development from creation to initial evaluation of disclosures to achieve a desired patent portfolio distribution. Initially, the current and future opportunity space for the business should be understood 30. This includes an analysis of factors such as emerging technology requirements, current intellectual property portfolio mix, current and future licensing revenue measurements, current and future business revenue measurements, research and technology development expertise, etc. Once the portfolio analysis 30 has been completed or updated, technology areas requiring intellectual property development are identified and targeted, i.e., portfolio objectives are created 40 using identified technology tags 42. Invention development guidelines per technology area are set based upon the portfolio analysis 30 information and resource constraints 44. Constraints may comprise available money, time units, capacity and any other measure which would operate as a constraint on the intellectual property activity to be managed.

Figure 3A:
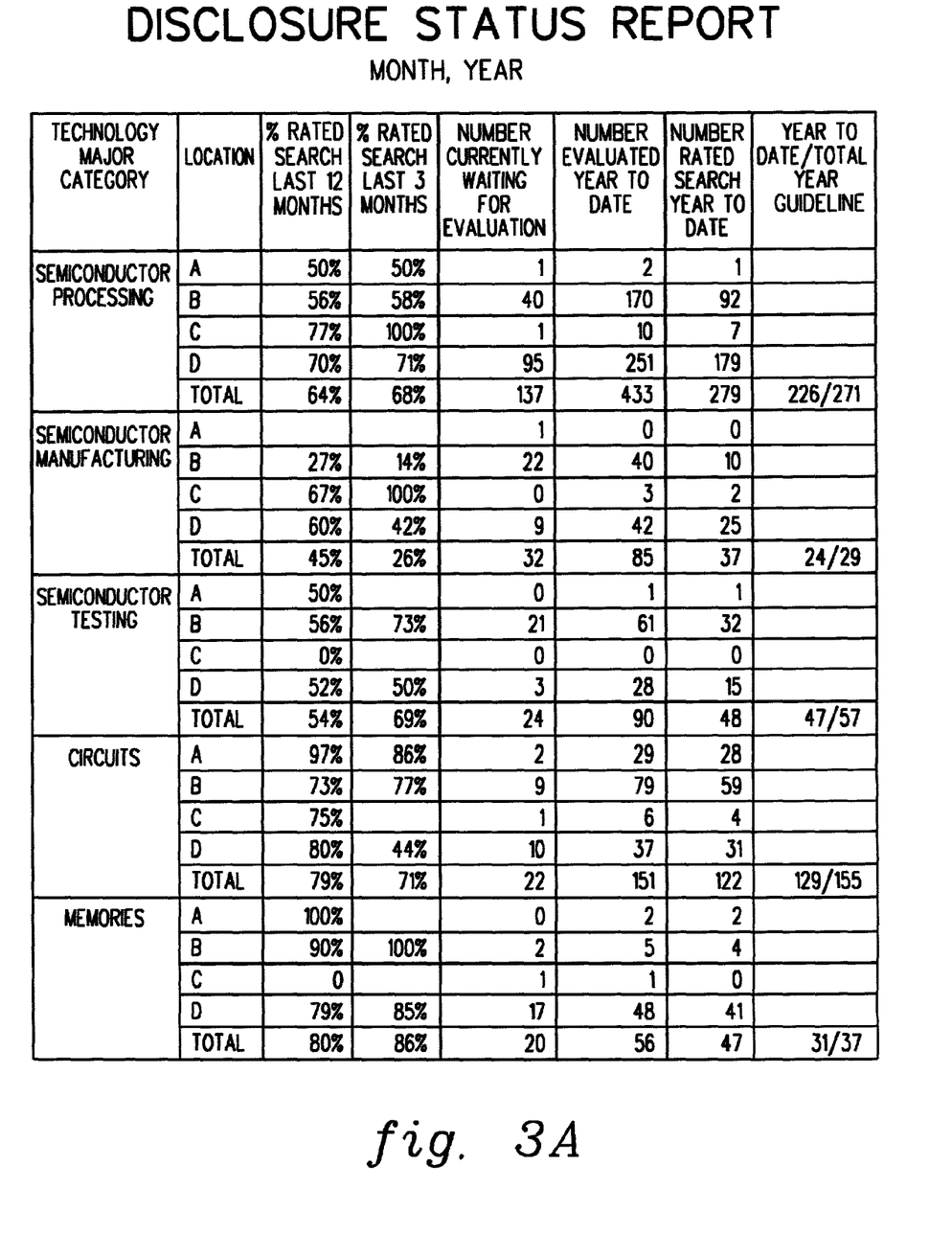
FIGS. 3A and 3B are a diagram of one embodiment of an intellectual property management report which can be generated in accordance with the principles of the present invention.
Figure 3B:
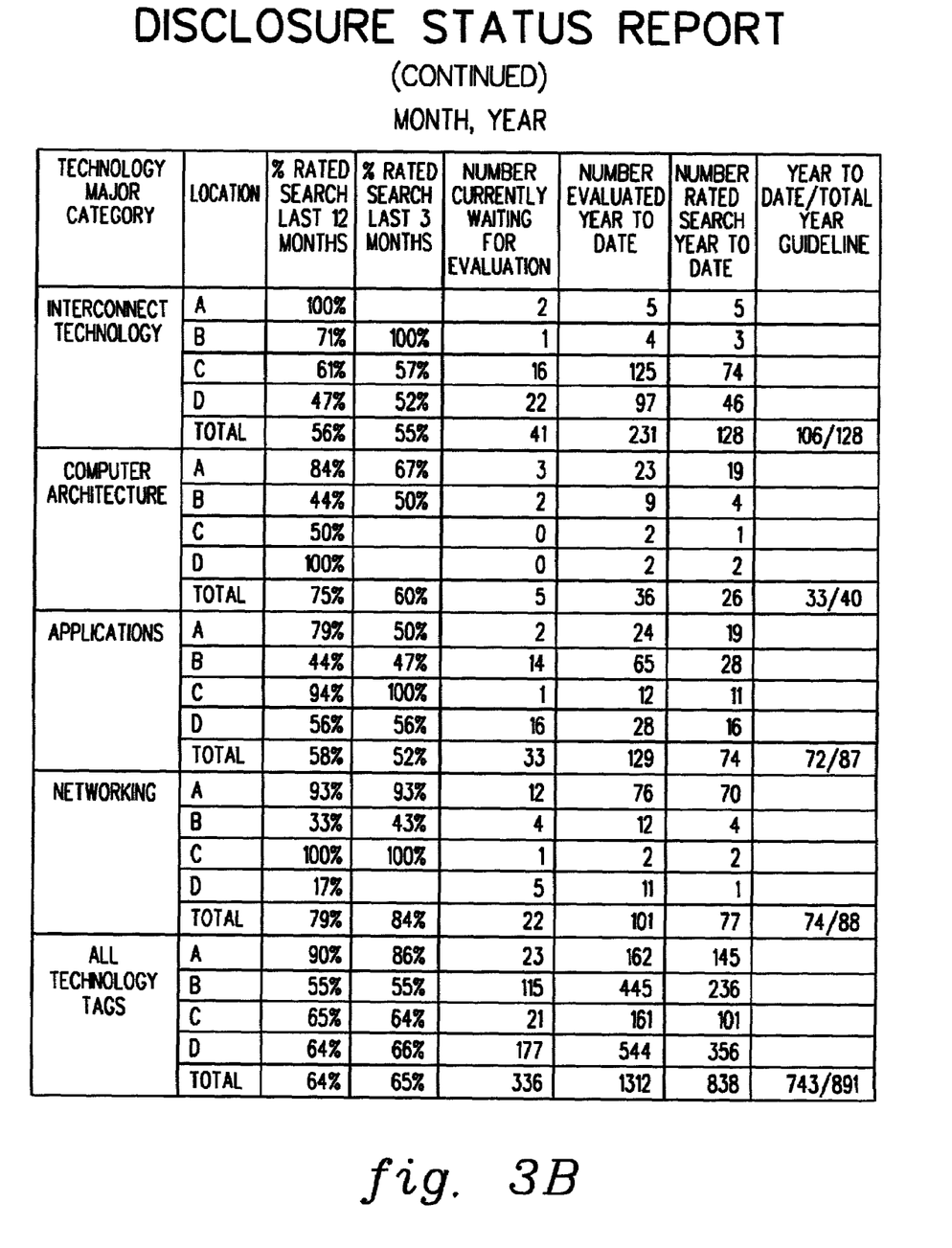

The portfolio objectives 40 and identified technology tags 42 are used in generating a patent activity report 50. The patent activity report details total disclosure activity in each of the technological categories comprising the portfolio, for example, relative to portfolio objectives, including: number of disclosures evaluated, number of disclosures selected for patent protection, number of disclosures waiting for evaluation and disposition, and relative success rate of disclosures over a given period of time. FIGS. 3A and 3B depict one example of such an activity report (described below).

Depending upon the type of activity report, IP creation activity may be initiated based on status of current disclosure activity compared to portfolio objectives 62. One aspect of the IP creation activity may be to intentionally generate new inventions 64 for which disclosures may be submitted 66. To accomplish this, lead technologists can identify and prioritize specific opportunities requiring invention development within the technology areas, and regularly communicate these opportunities to company employees. Simultaneously and continuously, inventors can be educated and motivated to innovate and document their innovations. Proactive invention development methods employing teams, composed of individuals having key skills relevant to the opportunity, may also be used to generate novel solutions. Proactive invention development methods include opportunity identification, brainstorming, associative thinking, critical thinking, and idea development exercises.

Note that the GENERATE NEW INVENTIONS activity 64 of FIG. 2 is separate from the INDEPENDENTLY CREATED INVENTION DISCLOSURES activity 68, which would conventionally be documented and submitted on the inventor's own initiative. Each invention disclosure is categorized by technical content or subject matter 70 by the person submitting the disclosure, for example, using the technology "tagging" system initially identified 42. The tagged invention disclosure data is analyzed regularly, through the generation of periodic patent activity reports, and compared to portfolio objectives in order to increase/decrease the proactive invention development focus, set evaluation criteria, adjust guidelines, and understanding what the IP mix is, for example, at various stages in the patent development process.

The received invention disclosures, which in one embodiment may be stored in the patent tracking system database, are forwarded to an evaluation process 80. Here, with a patent activity report(s) indicative of status of the patent activity relative to portfolio goals the disclosures are evaluated. In one embodiment, the evaluation process may be performed by one or more evaluation teams. Each disclosure is evaluated for patentability, business and licensing value in view of the portfolio goals identified in the patent activity report(s). If a particular disclosure does not meet the criteria for filing a patent application, then no action is taken and the record of the disclosure in the database 60 is updated with a rating of "Close." If sufficient interest is present to pursue patentability, a "Search" rating is indicated and the invention disclosure is forwarded for possible preparation of a patent application 90. The decision whether or not to forward a particular invention disclosure for patenting is data that is also fed back to the patent tracking system database 60, and is employed in the next patent activity report.

FIG. 3 depicts one embodiment of a patent activity report, herein referred to as a disclosure status report, which tracks the number of invention disclosures submitted for evaluation by major technology categories, and organizations and/or locations. This report, or data structure, includes separate fields which indicate the percent of invention disclosures rated search in the last twelve months, the percent of invention disclosures rated search in the last three months, the number of invention disclosures currently awaiting evaluation, the total number of invention disclosures evaluated year to date, the number of invention disclosures rated search (i.e., the number passed to process 90) year to date, and the year to date/total year to date objectives, again for each of the major technology categories and locations. Those skilled in the art will note that this report is merely one example of a patent activity report which could be generated using the concepts of the present invention. For example, subclasses within the major categories could also be tracked independently, and the twelve month period and three month time period for the percent of invention disclosures rated search could be adjusted. A disclosure status report such as depicted in FIGS. 3A & 3B provides an evaluator with a ready reference that shows all of the information needed to proactively manage resources to achieve, for example, yearly set guidelines for a given technology category and/or company location. The DISCLOSURE STATUS REPORT shown in FIGS. 3A and 3B shows status reporting in nine major or Technology categories for each of four reporting locations, A, B, C, and D.

By way of example, the following patent tracking system technology tags might be employed in generating the report of FIGS. 3A and 3B.

Semiconductor Processing
101A Back End of the Line Technology (BEOL)
101B Front End of the Line Technology (FEOL)
101C Photolithography Materials & Masks
101D Transistors, Devices or Cell Structures
180 Misc. Solid State Technology
190 Misc. Non-S/C Technology
Semiconductor Manufacturing
110A Manufacturing Apparatus
110B Modeling. CADCAM, Circuits, Processes
Semiconductor Testing
110C Testing. In-Line & Final
Circuits
120 Semiconductor Analog & Logic Circuits
170 Power Supplies
Memories
140 Semiconductor Memories
Interconnect Technology
150 Circuit Interconnect/Packaging & Material Recovery
Computer Architecture/Microprocessor
200 Central Processing Unit Organization & Control
209 Design Patents
210 Interfacing
220 Storage Management
230 Reliability/Availability/Serviceability
240 Multiprocessor
250 DP Programming
260 Network Computers
280 IA.64 Architecture
Applications
300 Moving Storage
400 Human Interface Front of Screen Display & User Input Systems
500 Displays and Printers
600 Software Related Services, Applications & Solutions
Networking
700 Networking Centric As can be seen, the nine major reporting categories in the status report are actually made up of one or more specifically defined Technology Tags. These tags, in turn, may further include additional more specific tags as subcategories. The level to which the status report is directed depends on the particular objectives established by the then current PORTFOLIO OBJECTIVES activity 40. Should a very specific subcategory within an existing Technology tag warrant independent management then it can be sub-divided into new tags which could be, on an individual basis, designated as a "reporting category."

In implementing the subject invention, the preferred embodiment utilizes two Lotus Notes (a trademark of Lotus Development Corporation) databases designated herein as INVENTION TRACKING SYSTEM DATABASE 60 and a PATENT PROSECUTION DATABASE (not shown). Access to Lotus Notes is available to most inventors and others involved in the invention process throughout the corporation at their desktops. When an inventor intends to submit an invention for review, a draft version of the document can be stored in the database. This copy can be retrieved and circulated to other inventors or associates for review and comment. When the inventor desires to submit the disclosure document, a selection is made as to the specific Technology Tag under which the inventor believes the invention should be categorized.

Submitted disclosure documents are entered into the database and next processed by an Intellectual Property Law organization responsible for the particular tag selected. If the IP Law organization administrator accepts the document as appropriate, the document is given a unique disclosure number, the Technology Tag(s) is entered on the disclosure document and the document is automatically forwarded to an Invention Development Team (IDT) for evaluation.

An IDT comprises a portfolio manager responsible for the technical area to which the disclosure is directed, a patent attorney or professional, one or more technical consultants and the inventor(s). The IDT reviews the invention and, based on the advice of the team members and consistent with Portfolio Objectives, determines the rating of the disclosure. The rating is entered into the disclosure record in the database 60. Disclosures can be rated "Close" (if no further action is deemed necessary), "Publish" (if defensive protection by publication is deemed appropriate) or "Search" (if patentability is to be further investigated).

The evaluation is entered into the disclosure document with reasons, if appropriate. If the evaluation is "Search" the responsible IP Law personnel can enter a specific concept to be searched and then send the entire disclosure document to a person who will perform a patentability search on the invention.

Periodically, statistically relevant information, such as the inventor's names, titles, Technology Tags and status of the disclosure and evaluation are "uploaded" to a DB2 (a trademark of International Business Machines Corporation) database where such statistical data can be extracted and used to generate various reports including Disclosure Status Reports, described above.

In addition to the disclosure database, there is also a PATENT PROSECUTION (not shown) database which contains information similar to that in the PATENT TRACKING SYSTEM DATABASE and is based on inventions for which the filing of patent applications has been chosen as well as those inventions on which applications have already been filed, or patents issued throughout the world. A corresponding DB2 database is used in conjunction with the PATENT PROSECUTION database to retain statistically relevant information about patent dockets on a corporate wide basis. Those skilled in the art will appreciate that extension of the method of the invention, as described, can be applied to various aspects of invention application management as previously discussed.

Figure 4:
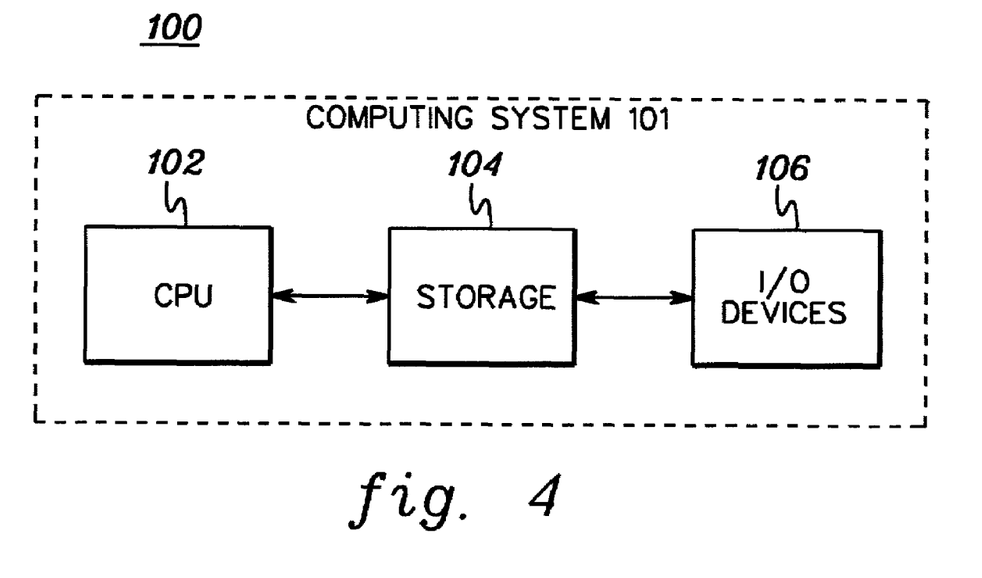
FIG. 4 depicts one example of an overview computing system which can be used to implement an intellectual property management facility in accordance with the principles of the present invention.

One example of a computing environment incorporating and using an intellectual property management facility in accordance with the present invention is depicted in FIG. 4 and described below.

Referring to FIG. 4, a computer environment 100 includes, for instance, a computing unit 101 having at least one central processing unit 102, a main storage 104 and one or more input/output devices 106, each of which is described below.

As is known, central processing unit 102 is the controlling center of computing unit 101 and provides the sequencing and processing facilities for instruction execution, interruption action, timing functions, initial program loading and other machine related functions. The central processing unit executes at least one operating system, which as known, is used to control the operation of the computing unit by controlling the execution of other programs, controlling communication with peripheral devices and controlling use of the computer resources.

Central processing unit 102 is coupled to main storage 104, which is directly addressable and provides for high speed processing of data by the central processing unit. Main storage may be either physically integrated with the CPU or constructed in stand alone units. The intellectual property database described herein may, in one embodiment, reside within main storage 104.

Main storage 104 is also coupled to one or more local or remote input/output devices 106. These devices include, for instance, keyboards, communications controllers, teleprocessing devices, printers, magnetic storage media (e.g., tape, disks), direct access storage devices, and sensor based equipment. Data is transferred from main storage 104 to input/output devices 106, and from the input/output devices back to main storage.

In one example, computer environment 100 can be a single system environment, which includes an RS/6000 computer system running an AIX operating system. (RS/6000 and AIX are offered by International Business Machines Corporation). The invention is not limited to such an environment, however. The capabilities of the present invention can be incorporated and used within many types of computer environments and many types of computer systems. For instance, computer environment 100 can include a UNIX workstation running a UNIX-based operating system. Other variations are also possible and are considered a part of the claimed invention.

The present invention can be included, for example, in an article of manufacture (e.g., one or more computer program products) having, for instance, computer usable media. This media has embodied therein, for instance, computer readable program code means for providing and facilitating the capabilities of the present invention. The articles of manufacture can be included as part of the computer system or sold separately.

Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A method for managing resource allocations within an intellectual property portfolio, said method comprising:
 (i) quantifying available resource capacity for an intellectual property activity managed via a computer tracking system;
 (ii) assigning technology tags to the activity in the computer tracking system, the technology tags representing different technology areas of interest;
 (iii) pre-apportioning as ideals the quantified available resource capacity for the activity to the different technology areas of interest in the computer tracking system based on a value assigned to each technology area of interest;
 (iv) periodically inputting actual resource usage by technology area into the computer tracking system; and
 (v) employing the computer tracking system in periodically generating a report indicative of the difference between the inputted actual resource usage and the pre-apportioned resource capacity ideals by technology areas of interest for use in managing resource allocation adjustments for the intellectual property activity.

2. The method of claim 1, wherein said employing (v) comprises proactively managing future resource allocation for the intellectual property activity by determining the difference between the inputted actual resource usage and the pre-apportioned resource capacity allocation by technology area of interest.

3. The method of claim 2, further comprising for a given time period, periodically repeating the inputting (iv) and the employing (v) to achieve within the given time period set goals for the intellectual property activity based on assigned technology tags.

4. The method of claim 3, wherein the assigning technology tags comprises assigning technology based descriptors to different technology fields of the intellectual property activity.

5. The method of claim 4, wherein the employing (v) comprises dynamically adjusting, within the given time period, resource allocation to at least one technology field of the intellectual property activity.

6. The method of claim 1, wherein the employing (v) comprises periodically assembling the report including the actual resource usage by technology areas of interest and set goals for the intellectual property activity based on assigned technology tags.

7. The method of claim 6, wherein the periodically assembled report further includes the actual resource usage by technology area of interest for a first time period and the actual resource usage by technology area of interest for a second time period, wherein the second time period is longer than the first time period.

8. The method of claim 7, wherein the employing (v) comprises comparing the actual resource usage by technology areas of interest for the first time period and the actual resource usage by technology areas of interest for the second time period, and based thereon, proactively adjusting resource allocation by technology areas of interest for the intellectual property activity to achieve the set goals.

9. The method of claim 8, wherein the first time period is less than five months and the second time period is at least two times the first time period.

10. The method of claim 8, wherein the first time period is in a range of two to four months and the second time period is at least three times the first time period.

11. The method of claim 1, wherein the intellectual property activity comprises at least one of (1) modulating invention disclosure creation activity, (2) evaluating invention disclosures, (3) searching inventions based on evaluated invention disclosures, (4) filing patent applications based on evaluated invention disclosures, (5) issuing patents, and (6) maintaining issued patents.

12. The method of claim 1, further comprising setting intellectual property activity goals, the setting including at least some of: (1) understanding current and future opportunity space for a business; (2) understanding the current intellectual property portfolio; (3) identifying technology fields requiring intellectual property development; (4) setting intellectual property development guidelines; and (5) identifying and communicating specific technology opportunities; and wherein the employing (v) comprises proactively managing the resource allocation by technology tag to achieve the intellectual property activity goals.

13. The method of claim 1, wherein the intellectual property activity comprises invention development, and wherein the employing (v) comprises proactively managing resource allocation to achieve invention development goals using the actual resource usage and the prior resource allocation by technology areas of interest.

14. A method for managing invention disclosures, comprising:
quantifying a desired number of invention disclosures based on available resources;
pre-apportioning in a computer tracking system the desired number of invention disclosures by a plurality of technology tags, representing different technology areas of interest, based on a value assigned to each of the technology areas of interest;
inputting an actual number of generated invention disclosures by technology area of interest into the computer tracking system, and employing the computer tracking system in periodically generating a report indicative of the difference between the inputted actual number of invention disclosures and the pre-apportioned desired number of invention disclosures by technology area of interest; and
using the periodically generated report to proactively manage at least one of invention disclosure creation and invention disclosure evaluation for patent searching or patent application filing.

15. The method of claim 14, wherein the report includes the actual number of invention disclosures by technology tag for a first time period and the actual number of invention disclosures by technology tag for a second time period, wherein the second time period is longer than the first time period.

16. The method of claim 15, wherein the second time period is inclusive of the first time period.

17. The method of claim 16, wherein the first time period is less than five months and the second time period is at least two times the first time period.

18. The method of claim 14, wherein said proactive managing comprises proactively taking action or adjusting criteria to achieve set goals for a given time period for said at least one of invention disclosure creation, and invention disclosure evaluation for patent searching or patent application filing.

19. The method of claim 18, wherein said technology tags comprise at least one of technology-based descriptors or location-based descriptors, and wherein said method further comprises assigning a technology tag to each actual invention disclosure for use by said computer tracking system.

20. The method of claim 19, wherein said proactive managing comprises adjusting at least one of invention disclosure creation, invention disclosure evaluation for patent searching, and patent application filing responsive to the comparing.

21. The method of claim 14, wherein the periodically assembled report includes the actual number of invention disclosures by technology areas of interest for a first time period and the actual number of invention disclosures by technology areas of interest for a second time period, wherein the second time period is longer than the first time period, and wherein the employing comprises comparing the actual number of invention disclosures by technology area of interest for the first time period and the actual number of invention disclosures by technology area of interest for the second time period, and wherein the proactive managing comprises responsive thereto, adjusting criteria to achieve set goals for at least one of invention disclosure creation, and invention disclosure evaluation for patent searching or patent application filing.

22. The method of claim 21, further comprising identifying the set goals, the identifying including at least some of: (1) understanding current and future opportunities space for a business; (2) understanding the current intellectual property portfolio; (3) identifying technology fields requiring intellectual property development; (4) setting intellectual property development objectives; and (5) identifying and communicating specific technology opportunities.

23. Apparatus for managing resource allocations within an intellectual property portfolio, said apparatus comprising:
means for quantifying available resource capacity for an intellectual property activity managed via a computer tracking system;
means for assigning technology tags to the activity in the computer tracking system, the technology tags representing different technology areas of interest;
means for pre-apportioning as ideals the quantified available resource capacity for the activity to the different technology areas of interest in the computer tracking system based on a value assigned to each technology area of interest;

means for periodically inputting actual resource usage by technology area into the computer tracking system; and means for employing the computer tracking system in periodically generating a report indicative of the difference between the inputted actual resource usage and the pre-apportioned resource capacity ideals by technology areas of interest for managing resource allocation adjustments for the intellectual property activity.

24. The apparatus of claim 23, wherein said means for employing (v) comprises means for proactively managing future resource allocation for the intellectual property activity by determining the difference between the inputted actual resource usage and the pre-apportioned resource capacity allocation by technology area of interest.

25. The apparatus of claim 24, further comprising for a given time period, means for periodically repeating the means for inputting and the means for employing to achieve within the given time period set goals for the intellectual property activity based on assigned technology tags.

26. The apparatus of claim 25, wherein the means for assigning technology tags comprises means for assigning technology based descriptors to different technology fields of the intellectual property activity.

27. The apparatus of claim 26, wherein the means for employing comprises means for dynamically adjusting, within the given time period, resource allocation to at least one technology field of the intellectual property activity.

28. The apparatus of claim 23, wherein the means for employing comprises means for periodically assembling the report including the actual resource usage by technology areas of interest and set goals for the intellectual property activity based on assigned technology tags.

29. The apparatus of claim 28, wherein the periodically assembled report further includes the actual resource usage by technology tag for a first time period and the actual resource usage by technology tag for a second time period, wherein the second time period is longer than the first time period.

30. The apparatus of claim 29, wherein the means for employing comprises means for comparing the actual resource usage by technology tag for the first time period and the actual resource usage by technology tag for the second time period, and based thereon, means for proactively adjusting resource allocation by technology areas of interest for the intellectual property activity to achieve the set goals.

31. The apparatus of claim 23, wherein the intellectual property activity comprises at least one of (1) modulating invention disclosure creation activity, (2) evaluating invention disclosures, (3) searching inventions based on evaluated invention disclosures, (4) filing patent applications based on evaluated invention disclosures, (5) issuing patents, and (6) maintaining issued patents.

32. The apparatus of claim 23, further comprising means for setting intellectual property activity goals, the setting including at least some of: (1) understanding current and future opportunity space for a business; (2) understanding the current intellectual property portfolio; (3) identifying technology fields requiring intellectual property development; (4) setting intellectual property development objectives; and (5) identifying and communicating specific technology opportunities; and wherein the means for employing comprises proactively managing the resource allocation by technology areas of interest to achieve the intellectual property activity goals.

33. The apparatus of claim 23, wherein the intellectual property activity comprises invention development, and wherein the means for employing comprises means for proactively managing resource allocation to achieve invention development goals using the actual resource usage and the prior resource allocation by technology areas of interest.

34. Apparatus for managing invention disclosures, comprising:

means for quantifying a desired number of invention disclosures based on available resources;

means for pre-apportioning in a computer tracking system the desired number of invention disclosures by a plurality of technology tags, representing different technology areas of interest, based on a value assigned to each of the technology areas of interest;

means for inputting an actual number of generated invention disclosures by technology area of interest into the computer tracking system, and means for employing the computer tracking system in periodically generating a report indicative of the difference between the actual number of invention disclosures by technology area of interest and the pre-apportioned desired number of invention disclosures by technology area of interest; and means for using the periodically generated report to proactively manage at least one of invention disclosure creation, and invention disclosure evaluation for patent searching or patent application filing.

35. At least one program storage device readable by a machine, tangibly embodying at least one program of instructions executable by the machine to perform a method of managing resource allocations within an intellectual property portfolio, said method comprising:

(i) quantifying available resource capacity for an intellectual property activity managed via a computer tracking system;

(ii) assigning technology tags to the activity in the computer tracking system, the technology tags representing different technology areas of interest;

(iii) pre-apportioning as ideals the quantified available resource capacity for the activity to the different technology areas of interest in the computer tracking system based on a value assigned to each technology area of interest;

(iv) periodically inputting actual resource usage by technology area into the computer tracking system; and (v) employing the computer tracking system in periodically generating a report indicative of the difference between the inputted actual resource usage and the pre-apportioned resource capacity ideals by technology areas of interest for managing resource allocation adjustments for the intellectual property activity.

36. The at least one program storage device of claim 35, wherein said employing (v) comprises proactively managing future resource allocation for the intellectual property activity by determining the difference between the inputted actual resource usage and the pre-apportioned resource capacity allocation by technology area of interest.

37. The at least one program storage device of claim 36, further comprising for a given time period, periodically repeating the inputting (iv) and the employing (v) to achieve within the given time period set goals for the intellectual property activity based on assigned technology tags.

38. The at least one program storage device of claim 37, wherein the assigning technology tags comprises assigning technology based descriptors to different technology fields of the intellectual property activity.

39. The at least one program storage device of claim 38, wherein the employing (v) comprises dynamically adjusting, within the given time period, resource allocation to at least one technology field of the intellectual property activity.

40. The at least one program storage device of claim 35, wherein the employing (v) comprises periodically assembling the report including the actual resource usage by technology areas of interest and set goals for the intellectual property activity based on assigned technology tags.

41. The at least one program storage device of claim 40, wherein the periodically assembled report further includes the actual resource usage by technology area of interest for a first time period and the actual resource usage by technology area of interest for a second time period, wherein the second time period is longer than the first time period.

42. The at least one program storage device of claim 41, wherein the employing (v) comprises comparing the actual resource usage by technology area of interest for the first time period and the actual resource usage by technology area of interest for the second time period, and based thereon, proactively adjusting resource allocation by technology areas of interest for the intellectual property activity to achieve the set goals.

43. The at least one program storage device of claim 35, wherein the intellectual property activity comprises at least one of (1) modulating invention disclosure creation activity, (2) evaluating invention disclosures, (3) searching inventions based on evaluated invention disclosures, (4) filing patent applications based on evaluated invention disclosures, (5) issuing patents, and (6) maintaining issued patents.

44. The at least one program storage device of claim 35, further comprising setting intellectual property activity goals, the setting including at least some of: (1) understanding current and future opportunity space for a business; (2) understanding the current intellectual property portfolio; (3) identifying technology fields requiring intellectual property development; (4) setting intellectual property development objectives; and (5) identifying and communicating specific technology opportunities; and wherein the employing (v) comprises proactively managing the resource allocation by technology areas of interest to achieve the intellectual property activity goals.

45. The at least one program storage device of claim 35, wherein the intellectual property activity comprises invention development, and wherein the employing (v) comprises proactively managing resource allocation to achieve invention development goals using the actual resource usage and the prior resource allocation by technology areas of interest.

* * * * *